No. 768,584. PATENTED AUG. 30, 1904.
M. C. CANFIELD.
AUTOMATIC SYNCHRONIZING APPARATUS.
APPLICATION FILED AUG. 3, 1903.
NO MODEL. 4 SHEETS—SHEET 1.
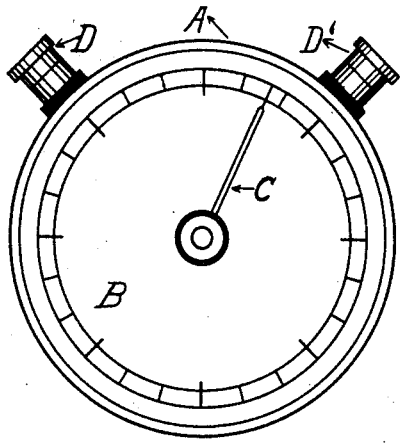
FIG. I.
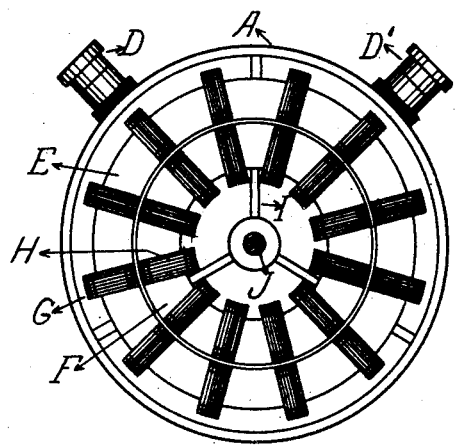
FIG. II.
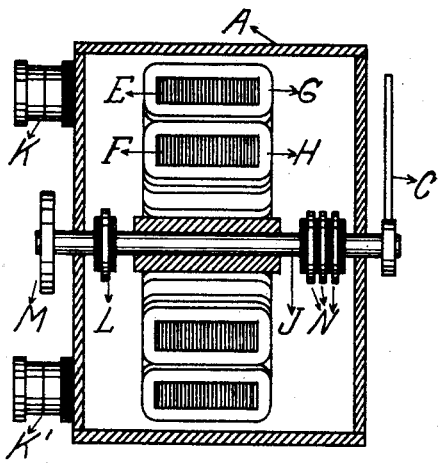
FIG. III.
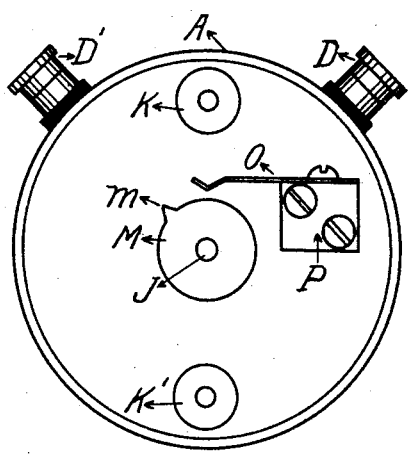
FIG. IV.
WITNESSES:
Ellison L. Mason
Bertha C. Hawley
INVENTOR.
Milton C. Canfield
BY
Philip E. Knowlton
ATTORNEY.

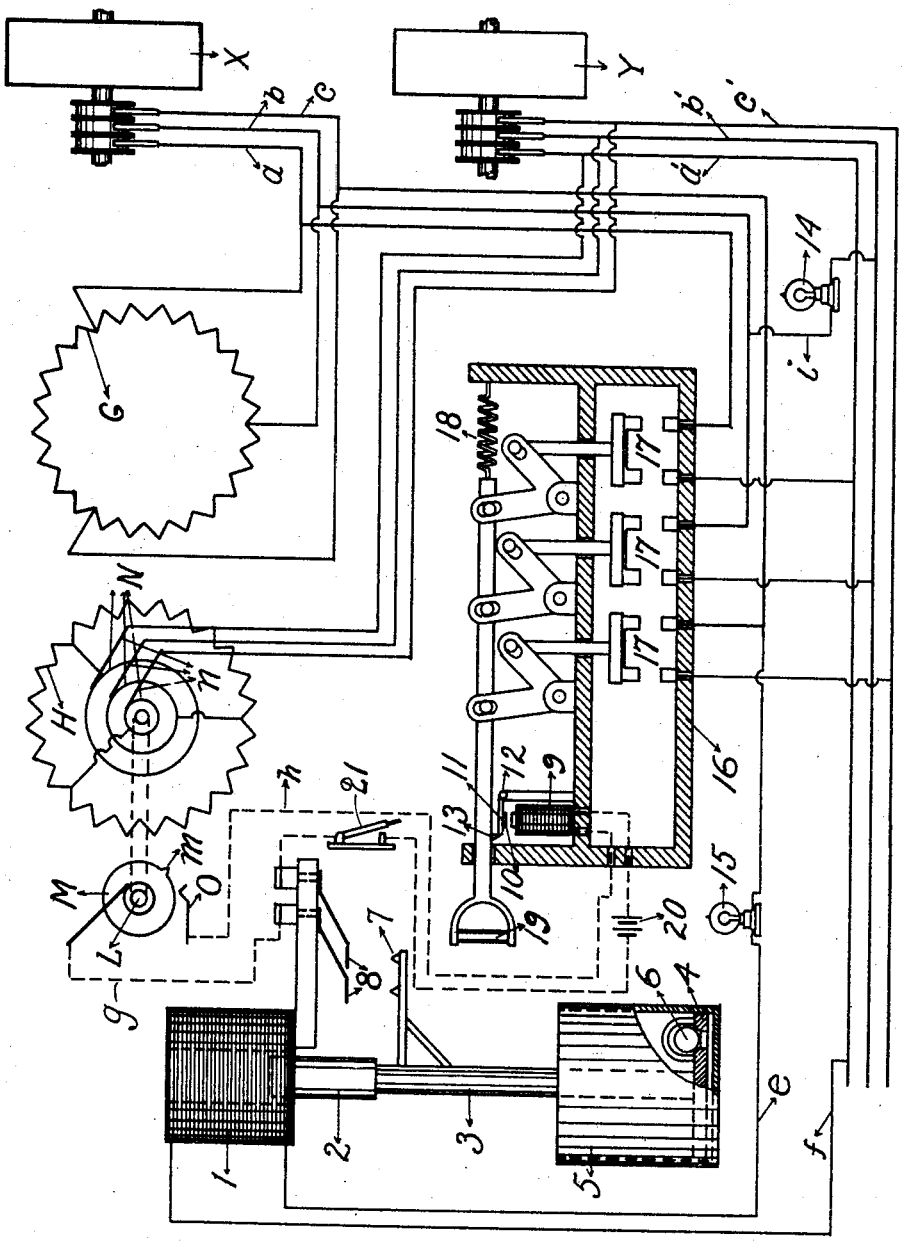

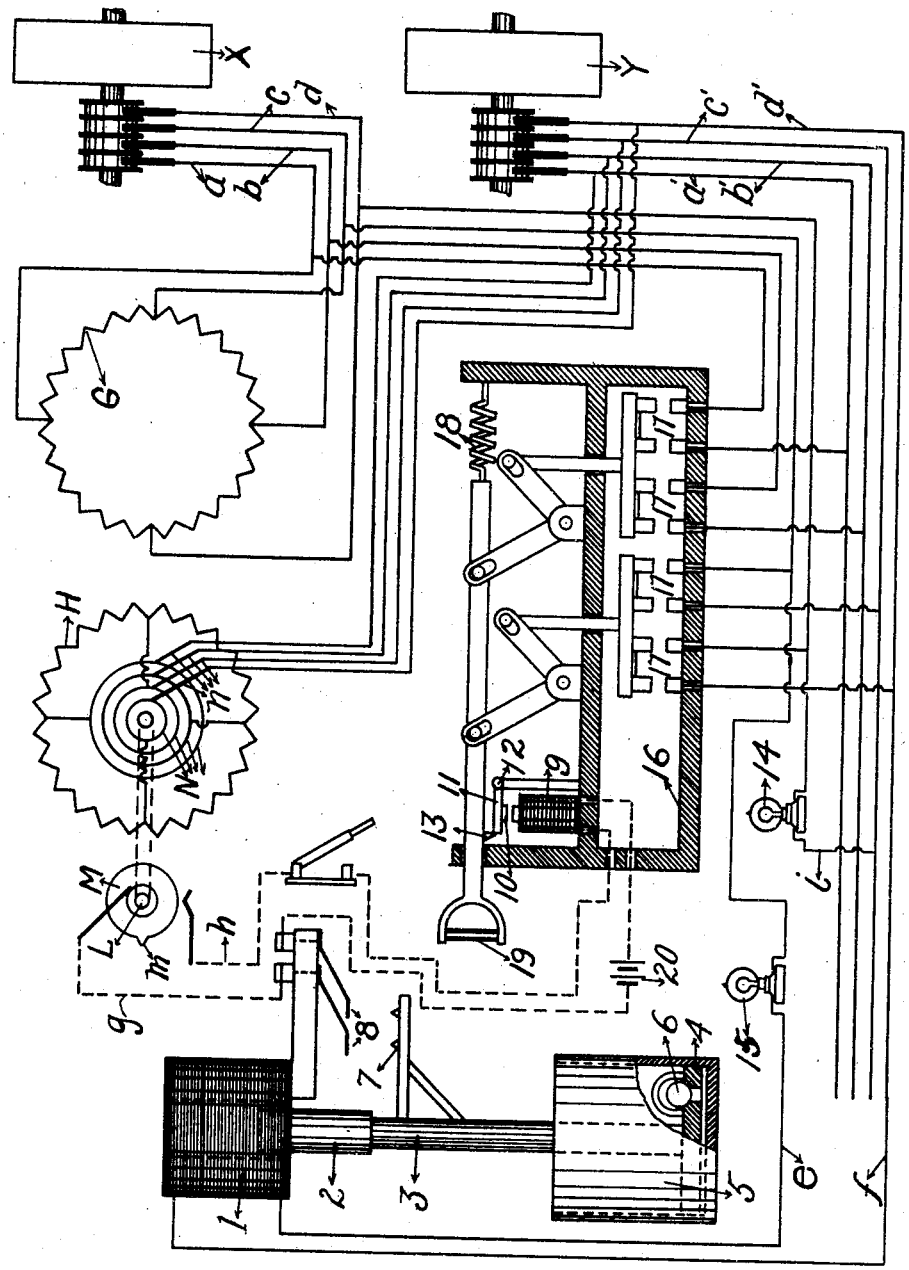

No. 768,584. PATENTED AUG. 30,
M. C. CANFIELD.
AUTOMATIC SYNCHRONIZING APPARATUS.
APPLICATION FILED AUG. 3, 1903.
NO MODEL.
4 SHEETS—SHEET 4.
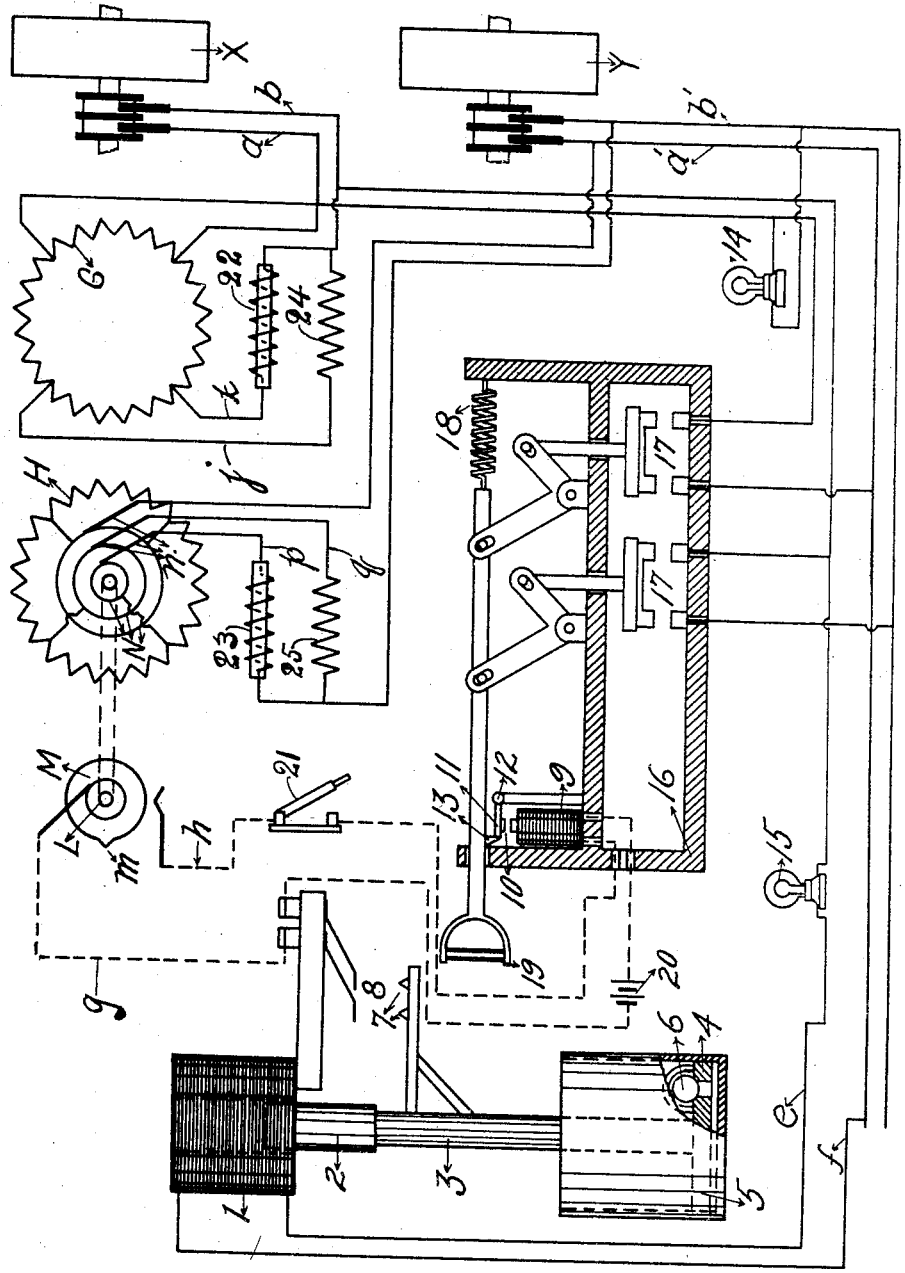
FIG. VII
WITNESSES:
Ellison L. Mason
Bertha C. Hawley
INVENTOR.
Milton C. Canfield
BY
Philip E. Knowlton
ATTORNEY.

No. 768,584.

Patented August 30, 1904.

UNITED STATES PATENT OFFICE.

MILTON C. CANFIELD, OF CLEVELAND, OHIO.

AUTOMATIC SYNCHRONIZING APPARATUS.

SPECIFICATION forming part of Letters Patent No. 768,584, dated August 30, 1904.

Application filed August 3, 1903. Serial No. 168,025. (No model.)

*To all whom it may concern:*

Be it known that I, MILTON C. CANFIELD, a citizen of the United States, residing at Cleveland, in the county of Cuyahoga and State of Ohio, have invented certain new and useful Improvements in Automatic Synchronizing Apparatus, of which the following is a specification.

My invention relates to improvements in apparatus for connecting synchronous alternating-current machines into the parallel relation automatically and is applicable for connecting in parallel any form of synchronous alternating-current machine with another such machine or group of machines already in action.

When it is desired to operate two or more alternating-current machines in parallel, the necessity of bringing the incoming machine, whether it be a generator, a rotary converter, or a synchronous motor, into synchronism with the machine or machines already in action before the coupling can be safely made is a well-known fact. At the present time this coupling is generally effected by the use of manually-operated switches, which are thrown at the proper moment, indicated by means of synchronizing-lamps or other visual synchronism indicators or my means of an audible device which indicates the moment of synchronism. This method is uncertain and difficult of operation and sometimes dangerous. It requires that the machines remain in synchronism several seconds at the time the switches are being thrown, a condition often difficult to secure, and the switch may be closed either before or after the instant of synchronism—that is to say, either too soon or too late—thus connecting the circuits when they are out of synchronism and producing thereby violent strains in the machinery and causing the blowing of fuses and other annoying and injurious results.

The object of my invention is to provide an apparatus which will automatically connect in parallel circuits carrying currents which differ in phase and frequency at the instant of synchronism, thereby eliminating the elements of human skill and judgment.

My invention consists, essentially, of three parts—first, a phase-responsive device which closes a contact in a local circuit at the instant of synchronism regardless of its duration; second, a device which will close a contact in a local circuit shortly before the instant of synchronism, keeping it closed until a short time after the instant of synchronism, but which will only operate so to close the local circuit when the alternating currents carried by the circuits to be connected in parallel are approaching the condition of synchronism at or slower than a predetermined rate; third, a local circuit with a source of current and an automatic switch operated by it.

The invention is illustrated in the accompanying drawings, wherein like letters and figures refer to like parts throughout the several views.

In said drawings, Figure 1 represents a front view of the phase-responsive device, which closes the local circuit $g\,h$ at the instant of synchronism; and Fig. 2 is a view of the same with the face or dial removed, disclosing the operating parts. Fig. 3 is a view of the phase-responsive device, partly in vertical section, parallel to the axis. Fig. 4 is a rear view of the instrument. Fig. 5 is an illustration, partly in diagram, of the apparatus complete, showing the same connected for the operation of a set of two three-phased circuits. Fig. 6 is an illustration similar to Fig. 5, showing the application of the synchronizer to the operation of a set of two two-phased circuits. Fig. 7 is a view of my invention, partly in diagram, illustrating the same as applied to a set of two single-phased circuits.

Referring now to Figs. 1 to 4, inclusive, A represents the case in which the phase-responsive device is mounted. B is a graduated dial over which the pointer C moves, indicating by its position the phase relations of the two alternating currents to be synchronized. E is a ring, preferably made of magnetic material, mounted in a fixed position in the case A. On the ring E are wound the coils of wire G, which are connected to the binding-posts D, the coils G being wound and connected in such a manner that when energized by one of the alternating currents with which the instrument is to be used a rotary magnetic field is produced in the said ring E. F is a similar ring, mounted on a shaft J and free to rotate about its axis. On the ring F are wound the coils H, which are also connected, so that when energized by a suitable alternating current led into said coils through the slip-rings N and the binding-posts D', a rotary magnetic field is produced in the ring F. The rotary magnetic fields are produced, respectively, in the stationary and the rotary member of the phase-responsive device by the currents to be synchronized. The coils H on the rotary ring F are connected to one of such currents, and the coils G on the stationary ring E are connected to the other of such currents in such a manner that the rotary fields generated by them will revolve in the same direction. The disk M, which is mounted on the shaft J and secured thereto, so as to revolve with it, is provided with a suitable contact-point $m$, which makes contact with the contact-spring O at any desired point in its revolution. The disk M will therefore close a local circuit at any desired point in its revolution. Such a circuit is carried from the binding-post K to the insulated spring O, which is mounted on the insulator P through the disk M to the slip-ring L and through a suitable bearing on the said slip-ring to the binding-post K'. If the coils G on the ring E and the coils H on the ring F are properly connected to two different sources of polyphase alternating current in such a manner as to produce two rotary magnetic fields (one in each of the said rings) revolving in the same direction and the two polyphase currents derived from such sources have the same frequency, the said rings E and F, with their respective coils G and H, will assume a certain position with respect to each other, such that the north magnetic poles of one ring will be opposite the south magnetic poles of the other ring, and will remain in such position so long as the relations of the currents continue unchanged. If, however, the currents are not of the same frequency, the ring F will rotate at a speed proportional to the difference in the frequencies of the two currents, and its direction of rotation will depend on which of the currents has the higher frequency. The pointer C will at all times indicate by its position the phase relations of the two currents, and the angle between the pointer and zero will always be the angle between the phases of the two operating-currents. Consequently the contact-spring O and the contact-point $m$ on the disk M will, if the disk be properly located on the shaft J, make contact at the instant when the currents are in synchronism, thereby completing the local circuit connected thereto.

Referring to Fig. 5, X and Y represent two three-phase alternators connected, respectively, to the circuits $a\ b\ c$ and $a'\ b'\ c'$. The instrument for closing the local circuit at the instant of synchronism (shown in detail in Figs. 1 to 4) is here indicated in diagram, M being the contact-disk, O the contact-spring, and L the slip-ring. H represents the winding or coils on the rotary ring F, connected by means of the slip-rings N and the contact-brushes $n$ to the circuit $a'\ b'\ c'$. G represents the winding or coils on the stationary ring E, connected to the circuit $a\ b\ c$. 1 is a solenoid which is connected by means of the conductors $e$ and $f$ between the opposite phase-leads $c$ and $a'$, leading, respectively, from the alternators X and Y, and the circuit between the two alternators and said solenoid is completed through the lamps or resistance 14 and the conductor $i$, which connects the phase-leads $b$ and $b'$, leading, respectively, from the alternators X and Y. Thus it will be observed that the solenoid 1 is cross-connected between the opposite phase-leads $a'$ and $c$ of the machines to be coupled and that therefore the current in the solenoid will be maximum when the currents in the circuits $a\ b\ c$ and $a'\ b'\ c'$ are in synchronism and zero when the currents in said circuits are in opposition. 15 represents a bank of lamps or any suitable resistance for reducing the current entering the solenoid. The solenoid 1 is provided with a magnetic core 2. The core 2 is connected by the rod 3 to the plunger 4, which works in a suitable fluid in the dash-pot 5. The plunger 4 has a valve 6, which opens to permit the escape of the fluid under the plunger when it is falling, but which closes when the plunger is rising, thus permitting the free fall of the plunger, but retarding its rise. Attached to the rod 3 is a contact-piece 7, which can make contact with the springs 8 when the rod 3 is raised, thereby closing the local circuit $g\ h$ at that point. 16 is a box inclosing the operating parts of the automatic switch. 17 17 17 are the switches which connect to the phase-leads of the alternator, circuits $a\ b\ c$ and $a'\ b'\ c'$, and are adapted to the purpose of connecting said circuits in parallel. The switches 17 17 17 are operated by means of suitable mechanism controlled by the spring 18 and are held open (or released) by means of the stop 13 and the detent 11, pivoted at 12, which detent is withdrawn by the energization of the electromagnet 9. The magnet 9 is energized through the local circuit $g\ h$ by means of a source of current 20. The local circuit $g\ h$ is broken at the contact-springs 8 and also at the contact-spring O. To switch together the circuits $a\ b\ c$ and $a'\ b'\ c'$ at the instant of synchronism, the apparatus is connected as shown in the drawings, and the spring 18 is set. If now the alternators X and Y are brought to speed and excited, the ring F and the coils H will revolve at a speed equal to the difference of the frequencies of the currents in the circuits $a\ b\ c$ and $a'\ b'\ c'$, causing the contact-point $m$ of the disk M and the spring O to make contact at the instance of synchronism at each revolution of the disk M. This action will, however, close only one of the openings in the local circuit *g h*. The current flowing in the solenoid 1 and its connecting-circuit *e f* will rise to a maximum each time that the currents in circuits *a b c* and *a' b' c'* pass the point of synchronism and will tend to lift the core 2 and the rod 3. The lifting of the core 2 and the rod 3 will be retarded by the action of the plunger 4 working in the dash-pot 5; but said core and rod will fall back freely as the current ceases to flow. As the frequencies of the currents in the circuits *a b c* and *a' b' c'* become more and more nearly equal the currents in solenoid 1 will last for a longer and longer period of time, and when the frequencies of the two currents are approximately the same the currents in the solenoid will be maintained for a period long enough to overcome the delayed action of the dash-pot and will raise the contact-piece 7 into contact with the springs 8, thereby closing the local circuit *g h* at that point. Then at the instant of synchronism the contact-point *m* on disk M will engage with the spring O, thereby completing the local circuit *g h* and energizing the magnet 9. The magnet 9 will then attract its armature 10, attached to the detent 11, thereby releasing the spring 18 and permitting it to close the switches 17 17 17, and thus connecting the circuits *a b c* and *a' b' c'* in parallel exactly at the instant of synchronism. The retardation secured by the action of the solenoid 1, dash-pot 5, and plunger 4 assures the operation of the paralleling-switches 17 17 17 and the mechanism controlling the same only when the currents in the circuits *a b c* and *a' b' c'* are approaching the condition of synchronism slowly and at or slower than the predetermined rate. The contact-point *m* of the disk M engages the spring O, thereby closing the local circuit *g h* only at the exact instant of synchronism. This insures the operation of the device only when the currents are in synchronism. A manually-operated switch 21 in the local circuit *g h* prevents the operation of the device until such time as the operator desires, thus permitting the separate use of the machines.

Fig. 6 illustrates the synchronizer as applied to two-phased circuits. In this case the operation is the same. The parts shown in Fig. 6 are the same as those shown in Fig. 5, except that the windings and connections of the coils H and G are adapted to suit the conditions that obtain in the two-phased circuit.

When the synchronizer is to be used with single-phased circuits, as illustrated in Fig. 7, in order to produce the rotary fields in the coils G and H it is necessary to supply these coils with suitable polyphased currents. The single-phased current from the alternator may be split into a two or a three phased current suitable for this purpose by any of the well-known methods of phase-splitting. In Fig. 7 the coils G and H are each supposed to be constructed with two-phase rotary field-windings. The coil G is supplied with two currents differing in phase from each other by splitting the current derived from the alternator X. One of these currents is supplied through the circuit *k*, containing the impedance-coil 22, and the other one is supplied through the circuit *j*, containing the non-inductive resistance 24. By means of this device currents are secured in the circuits *j* and *k*, which differ considerably in phase and which produce as a result a rotary magnetic field in the coil G. In a like manner the coil H is supplied with currents differing in phase by splitting the current from the alternator Y by means of the circuit *p*, containing the impedance-coil 22, and the circuit *q*, containing the non-inductive resistance 25, and, as a consequence, a rotary magnetic field is produced in the coil H.

I am aware that other modes of applying the principle of my invention may be employed for the mode herein explained. Change, therefore, may be made as regards the mechanism thus disclosed, provided that the principle of construction set forth, respectively, in the following claims is employed.

I therefore particularly point out and claim as my invention—

1. In automatic synchronizing apparatus, the combination of two or more sources of alternating electric current; a phase-responsive device consisting of two concentric elements, one of which is stationary, the other free to rotate about its axis, each element carrying a system of rotary magnetic field-coils; means for connecting the stationary element with the current derived from one of said sources; means for connecting the rotary element with the current derived from another of said sources; a mechanism operated by the phase-responsive device, and means associated with the same for limiting its operation to a period of phase similarity in the two sources of predetermined duration; substantially as described.

2. In automatic synchronizing apparatus, the combination of two or more circuits carrying alternating electric currents differing in phase and frequency; a phase-responsive device which is composed of two concentric elements, one stationary, the other free to rotate about its axis; means for energizing said stationary element with a current derived from one of the circuits, and means for energizing said rotary element with the current derived from another of the circuits so as to produce two rotary magnetic fields, one in each of said elements, revolving in the same direction; a mechanism operated by the phase-responsive device, and means associated with the same for limiting its operation to a period of phase coincidence between the currents of predetermined duration; substantially as described.

3. In automatic synchronizing apparatus, the combination of two circuits carrying alternating currents differing in phase and frequency; a phase-responsive device comprising two concentric elements, one of which is stationary, and the other free to rotate about its axis; means for creating in each of said elements with the currents derived from said circuits, a rotary magnetic field responsive to changes in phase and frequency in the currents which respectively produce them, said fields being adapted to react upon each other so as to cause movement of the rotary element correspondent to such phase changes; a mechanism operated by the phase-responsive device, and means associated with the same for limiting its operation to a period of phase similarity in the currents in the circuits, of predetermined duration; substantially as described.

4. In automatic synchronizing apparatus, the combination of two circuits carrying alternating currents differing in phase and frequency; a phase-responsive device comprising two concentric elements, one of which is stationary, and the other free to rotate about its axis; means for creating in each of said elements with the currents derived from said circuits, a rotary magnetic field, said rotary magnetic fields being adapted to react upon each other in proportion to the variations in the phase and frequency of the currents which respectively produce them, whereby the said rotary element is caused to alter its position with respect to the phase-angle changes between the currents; means for indicating the angular difference in phase between the currents in the two circuits; a mechanism operated by the phase-responsive device, and means associated with the same for limiting its operation to a period of phase coincidence between the currents in the circuits of predetermined duration; substantially as described.

5. In automatic synchronizing apparatus, the combination of two sources of alternating current differing in phase and frequency; a phase-responsive device consisting of two concentric elements, one stationary, the other free to rotate about its axis; means for connecting the stationary element to the current derived from one source; means for connecting the rotary element with the current derived from the other source; apparatus for creating, by means of said currents, a rotary magnetic field in each element, responsive to changes in phase and frequency in said currents, and adapted to react upon each other so as to cause the rotary member to assume different angular positions, correspondent to the phase-angle changes between said currents; means for indicating the angular difference in phase between the currents; a mechanism operated by the phase-responsive device, and means associated therewith for limiting its operation to a period of phase similarity in the currents of predetermined duration; substantially as described.

6. In automatic synchronizing apparatus, the combination of two circuits carrying alternating currents differing in phase and frequency; a phase-responsive device consisting of two concentric elements, one of which is stationary, the other free to rotate about its axis; means for energizing said elements with the currents derived from said circuits, so as to produce between them, a plurality of magnetic reactions, varying with the changes in the phase and frequency of the currents respectively producing them, whereby the rotary element is caused to assume different angular positions corresponding to the phase relations between the currents in the two circuits; means for indicating the angular difference in phase between the currents; a mechanism operated by the phase-responsive device, and means associated with the same for limiting its operation to a period of phase similarity in the currents of predetermined duration; substantially as described.

7. The combination of two circuits carrying alternating currents differing in phase and frequency; a phase-responsive device consisting of two concentric elements, one stationary, the other free to rotate about its axis; means for energizing said elements with the currents derived from said circuits, so as to create between them a plurality of magnetic reactions, varying with the changes in phase and frequency between the currents respectively producing them, whereby the rotary element is caused to assume different angular positions corresponding to the phase relations between such currents; an automatic switch operated by the phase-responsive device, and means for limiting its operation to a period of phase coincidence between the currents in the two circuits of predetermined duration; substantially as described.

8. The combination of two circuits carrying alternating currents differing in phase and frequency; a phase-responsive device consisting of two concentric elements, one stationary, the other free to rotate about its axis; means for energizing said elements with the currents derived from said circuits, so as to create between them a plurality of magnetic reactions, varying with the changes in frequency between the currents respectively producing them, whereby the rotary element is caused to assume different angular positions corresponding to the phase relations between such currents; an automatic switch operated by the phase-responsive device, and means for limiting such operation to any predetermined point in the revolution of the rotary element of the phase-responsive device; substantially as described.

9. In automatic synchronizing apparatus, the combination of two circuits carrying alternating currents differing in phase and frequency; a phase-responsive device consisting of two concentric elements, one stationary, the other free to rotate about its axis; means for energizing said elements with the currents derived from said circuits, so as to create between them a plurality of magnetic reactions, varying with the changes in phase and frequency between the currents respectively producing them, whereby the rotary element is caused to assume different angular positions corresponding to the phase relations between such currents; an automatic switch adapted to be closed at any desired point in the revolution of the rotary element of the phase-responsive device; and a retarding device adapted to prevent the closing of said switch until the currents in the two circuits are in synchronism; substantially as described.

10. In automatic synchronizing apparatus, the combination of two circuits carrying alternating currents differing in phase and frequency; a phase-responsive device comprising two concentric elements, one of which is stationary, and the other free to rotate about its axis; means for energizing said elements with currents derived from said circuits, so as to produce between them a plurality of magnetic reactions, varying with the changes in phase and frequency between the currents respectively producing them, whereby the rotary element is caused to assume different angular positions correspondent to the phase relations between such currents; an automatic switch to couple said circuits together; means for automatically closing said switch; and a time-element device, adapted to prevent the closing of said switch until the currents in the circuits to be coupled are in synchronism; substantially as described.

11. In automatic synchronizing apparatus, the combination of two or more sources of alternating electric current; a phase-responsive device consisting of current or series coils adapted, under the influence of current, to produce rotating magnetic fields, and means for rotatively mounting one set of coils, so as to be movable without restraint, within the influence of the other set of coils; a mechanism operated by the phase-responsive device; and means associated with the same for limiting its operation to a period of phase similarity of the currents, of predetermined duration; substantially as described.

12. In automatic synchronizing apparatus, the combination of two or more sources of alternating electric current; a phase-responsive device comprising two members mounted so as to be movable relatively to each other without mechanical restraint, and means for developing in each of said members rotary magnetic fields having the same direction of rotation; a mechanism operated by the phase-responsive device, and means associated therewith for limiting its operation to a period of phase similarity in the two sources of predetermined duration; substantially as described.

13. In automatic synchronizing apparatus, the combination of two or more sources of alternating electric current; a phase-responsive device comprising two members mounted so as to be movable relatively to each other without mechanical restraint, and means for developing in each of said members rotary magnetic fields having the same direction of rotation; a mechanism operated by the phase-responsive device, and means associated therewith for limiting its operation to a period of suitable phase relation, in the currents, of predetermined duration; substantially as described.

14. In automatic synchronizing apparatus, the combination of two alternating-current circuits; an automatic switch; a control-magnet; a control-circuit; an element comprising members movable relatively to each other without restraint, and means for generating in said members, by currents derived from said circuits, rotary magnetic fields having the same direction of rotation, said element being adapted to close the control-circuit at the instant when the two alternating-current circuits are in phase; and an element operated by such circuits, adapted to close the control-circuit at the moment when the said circuits are at, or very near, the same frequency; substantially as described.

In testimony whereof I have signed my name to this specification in the presence of two subscribing witnesses.

MILTON C. CANFIELD.

Witnesses:
HERBERT SMITH,
CHESTER AVERILL.